United States Patent

Baruh

[11] Patent Number: 6,164,870
[45] Date of Patent: Dec. 26, 2000

[54] PORTABLE DIKE HAVING AIR INFLATABLE REINFORCEMENT

[76] Inventor: Bradford G. Baruh, 816 Hayne Rd., Hillsborough, Calif. 94010

[21] Appl. No.: 09/066,082

[22] Filed: Apr. 24, 1998

[51] Int. Cl.[7] ............................................. E02B 7/20
[52] U.S. Cl. ........................ 405/114; 405/52; 405/91; 405/115
[58] Field of Search .................... 405/114, 115, 405/91, 21, 52, 107

[56] References Cited

U.S. PATENT DOCUMENTS

| | | | |
|---|---|---|---|
| 3,213,628 | 10/1965 | Serota | 405/114 X |
| 3,834,167 | 9/1974 | Tabor | 405/115 |
| 4,330,224 | 5/1982 | Muramatsu et al. | 405/115 |
| 4,555,201 | 11/1985 | Paoluccio | 405/21 X |
| 4,692,060 | 9/1987 | Jackson, III | 405/115 |
| 4,921,373 | 5/1990 | Coffey | 405/115 |
| 4,958,956 | 9/1990 | Tanaka et al. | 405/21 X |
| 4,966,491 | 10/1990 | Sample | 405/21 X |
| 4,981,392 | 1/1991 | Taylor | 405/115 |
| 5,040,919 | 8/1991 | Hendrix | 405/415 |
| 5,059,065 | 10/1991 | Doolaege | 405/91 X |
| 5,511,902 | 4/1996 | Center | 405/16 |
| 5,605,416 | 2/1997 | Roach | 405/21 |
| 5,645,373 | 7/1997 | Jenkins | 405/114 X |

FOREIGN PATENT DOCUMENTS

| | | | |
|---|---|---|---|
| 0069911 | 4/1983 | Japan | 405/115 |
| 404030012 | 2/1992 | Japan | 405/115 |

*Primary Examiner*—Dennis L. Taylor
*Attorney, Agent, or Firm*—Kevin H. Fortin

[57] ABSTRACT

An inflatable dike formed from sections includes an upper and lower partition. The lower partition includes a water inlet and is water-fillable via the water inlet to add weight to the dike. The upper partition attaches to partially surround to the lower partition. The upper partition includes an air inlet for inflating the upper partition with air. The upper partition inflates to add rigidity, and to laterally support the lower partition.

18 Claims, 6 Drawing Sheets

PORTABLE DIKE HAVING AIR INFLATABLE REINFORCEMENT

BACKGROUND OF THE INVENTION

1. Field of the Invention

The present invention pertains to portable dikes, and more particularly, to portable dikes which are fluid-filled.

2. Background Art

An age old flood control tool is the sandbag. Sandbags are typically stacked in layers to divert water to an area where the water will not cause property damage. Even though the bag is porous, the sand filler is dense enough to prevent water flow through the bag. The sand also adds weight so that flood water will not normally move the sandbag.

One problem with using sandbags is that the bags must be filled, carried and stacked. The sandbags are heavy. Preparing a sandbag dike is labor intensive and possibly back breaking work. In cases where manpower is limited, and flash floods are possible, there may not be enough time to fill, move and stack sandbags to prevent property damage. A portable dike is desired which can be rapidly constructed and positioned with minimum manpower.

U.S. Pat. No. 4,921,373 to Coffey discloses a fluid-filled dike having a frame with a plurality of legs. Fluid, such as water, is often readily available at a flood site. Using the water to fill a container eliminates the need for sand. One drawback, however, of the Coffey invention is that the dike is difficult to assemble. The legs must be assembled, adjusted and affixed to the ground.

U.S. Pat. No. 5,040,919 to Hendrix discloses a water-filled dike partition. The partition has a triangular cross-section. The partition walls include triangular gussets, which are rigid enough to maintain the triangular cross-section. Legs are not needed. A gussetted dike partition, however, may be undesirably bulky to hand carry. Accordingly, possible drawbacks of the Hendrix invention are excessive weight and lack of portability.

U.S. Pat. No. 4,981,392 to Taylor discloses a multi-partition water-filled dike. The partitions are cylindrical shaped and interconnected along a horizontal mid-plane by a sheet of high-strength material. Water fills the cylindrical partitions to maintain the cylindrical partition shape. The partitions are stacked to form a dike. One benefit of the Taylor invention is that the partitions are relatively easy to individually fill. One drawback is that for each partition length, at least two partitions must be filled with water. This takes twice the effort as filling a single partition.

Water and sand take time to fill dike partitions and sandbags, respectively. What is desired is a quick and more efficient way of providing a portable dike. What is also desired is a portable dike, which is lightweight.

SUMMARY OF THE INVENTION

The dike of the present invention includes interconnected inflatable dike sections. Each section includes an upper and lower partition. Each partition includes an inlet for inflating the partition. The lower partition is water fillable and normally holds water to weight the dike. The upper partition is air fillable and normally holds air to shape and support the lower partition.

The dike is portable and compresses and folds for easy transport. To set up the dike, each section pre-inflates. Handles are provided on each section and attach to the upper partition. Lifting the handles lifts the upper partition and pre-inflates both the upper partition and the lower partition with air. Pre-inflation pre-shapes the partitions.

Water fills at least a portion of the lower partition. It can be appreciated that filling the lower partition with water increases the air pressure within the lower partition. This increased air pressure helps to shape the lower partition.

The lower partition has vents in fluid communication with the upper partition. The vents release excess pressure from the lower partition. The vents also guide air from the lower partition into the upper partition as water fills the pre-shaped lower partition. This increases the air pressure in the upper partition and enables the upper partition to become rigid to shape and support the lower partition. Air pressure also shapes the upper partition to inhibit water from splashing over the dike.

According to one aspect of the invention, the vents include pressure relief valves to regulate pressure within the lower partition. Accordingly, a desired pressure may be maintained in the lower partition to optimize partition shape.

According to another aspect of the invention, the upper partition inlet includes a pressure relief valve for regulating pressure within the upper partition. Should the upper partition exceed a pre-determined pressure, the relief valve would release fluid to prevent the upper partition from exploding, or leaking due to over-pressurization.

The lower partition forms a triangular prism having a floor and two sides. The upper partition surrounds the two sides. Preferably, the upper partition includes at least two lobes designed to cause the lower partition to maintain the prism shape. The lobes cover each side of the lower partition according to one embodiment of the present invention. Other configurations, however, may be used.

The lobes are both triangular prism shaped, and inverted with respect to the lower partition. Accordingly, inflation of each partition forms the dike section into a square prism shape.

DETAILED DESCRIPTION OF THE INVENTION

Figure 1:
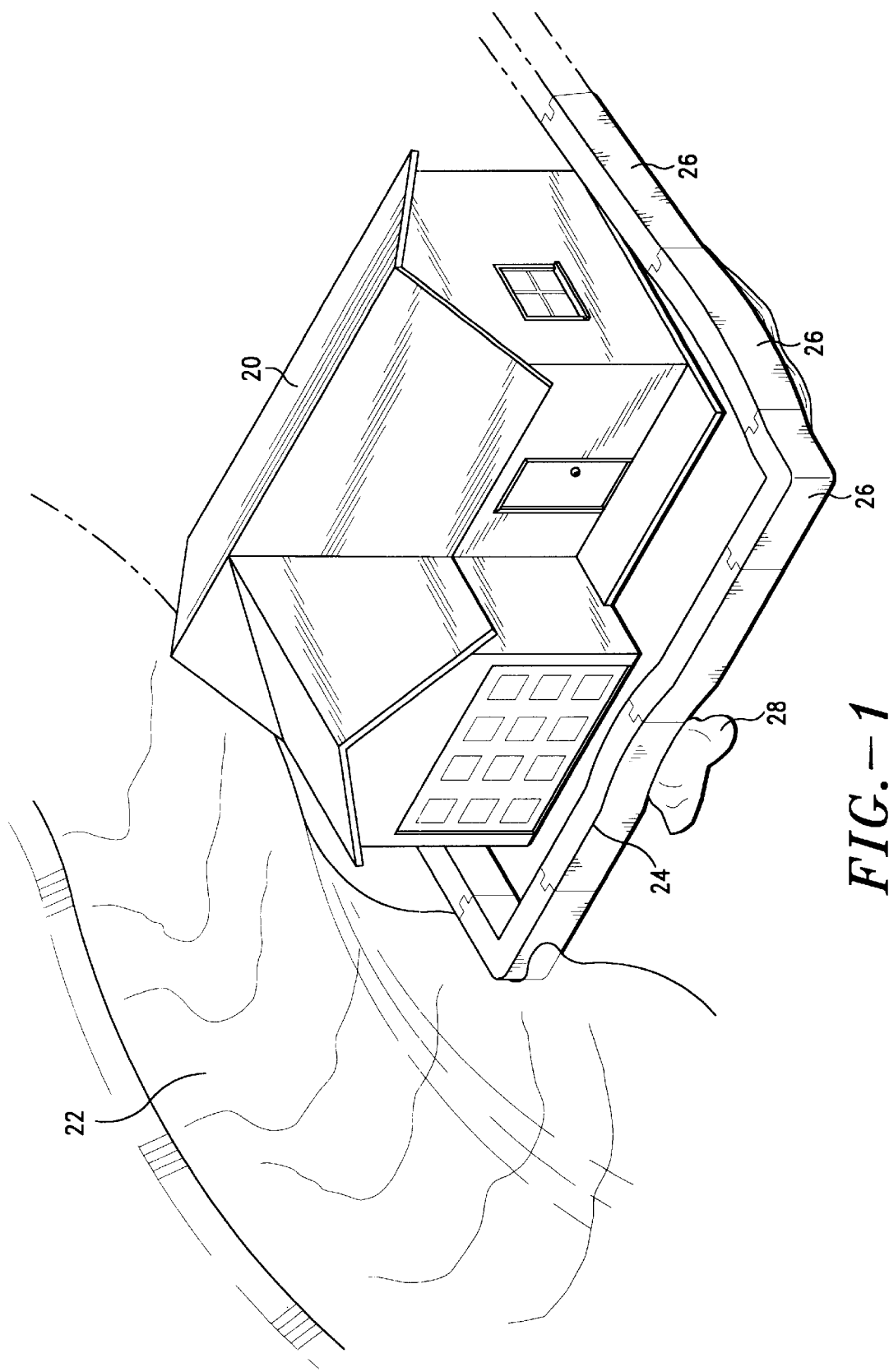
FIG. 1 is a perspective view of a portable dike by a house in accordance with the present invention.

FIG. 1 shows a house 20, surface water 22, and an inflatable dike 24. The dike 24 includes multiple interconnected dike sections 26. The dike sections 26 align in an end to end formation. The dike 24 surrounds much of the house 20 and blocks the surface water 22. The dike 24 flexes to accommodate ground irregularities such as the rock 28.

Figure 2:
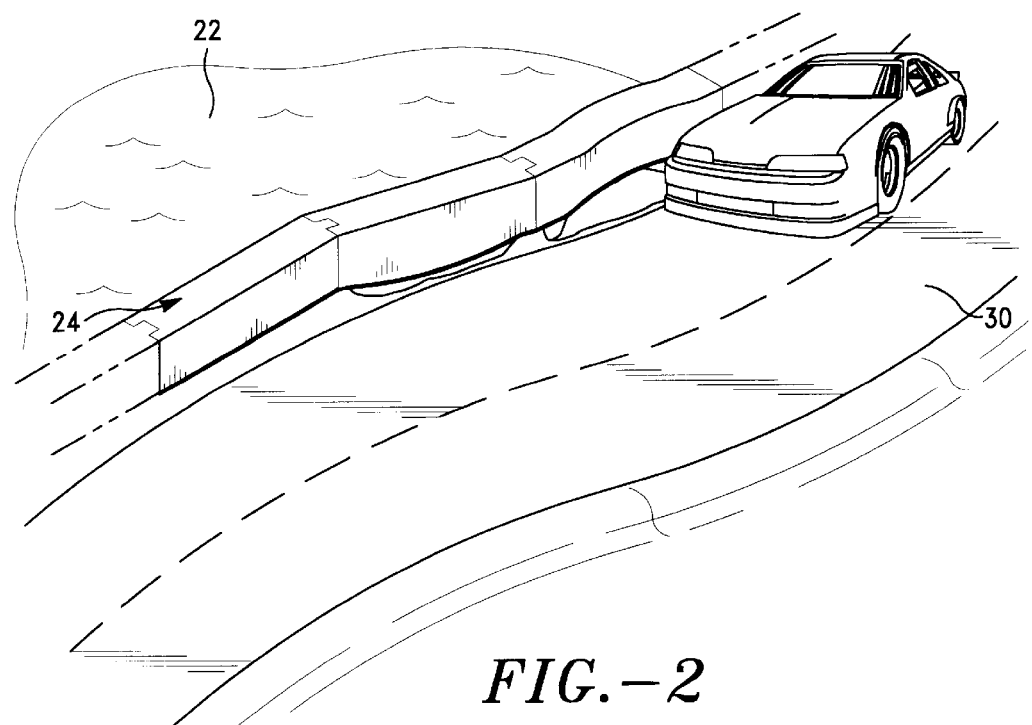
FIG. 2 is a perspective view of the portable dike of FIG. 1 by a roadside.

FIG. 2 shows a roadway 30 and surface water 22 adjacent the roadway 30. The dike 24 stands between the surface water 22 and the roadway 30 and blocks the surface water 22 from flowing onto the roadway 30. The roadway 30 curves. The dike 24 flexes and conforms to the roadway curvature.

Figure 3:
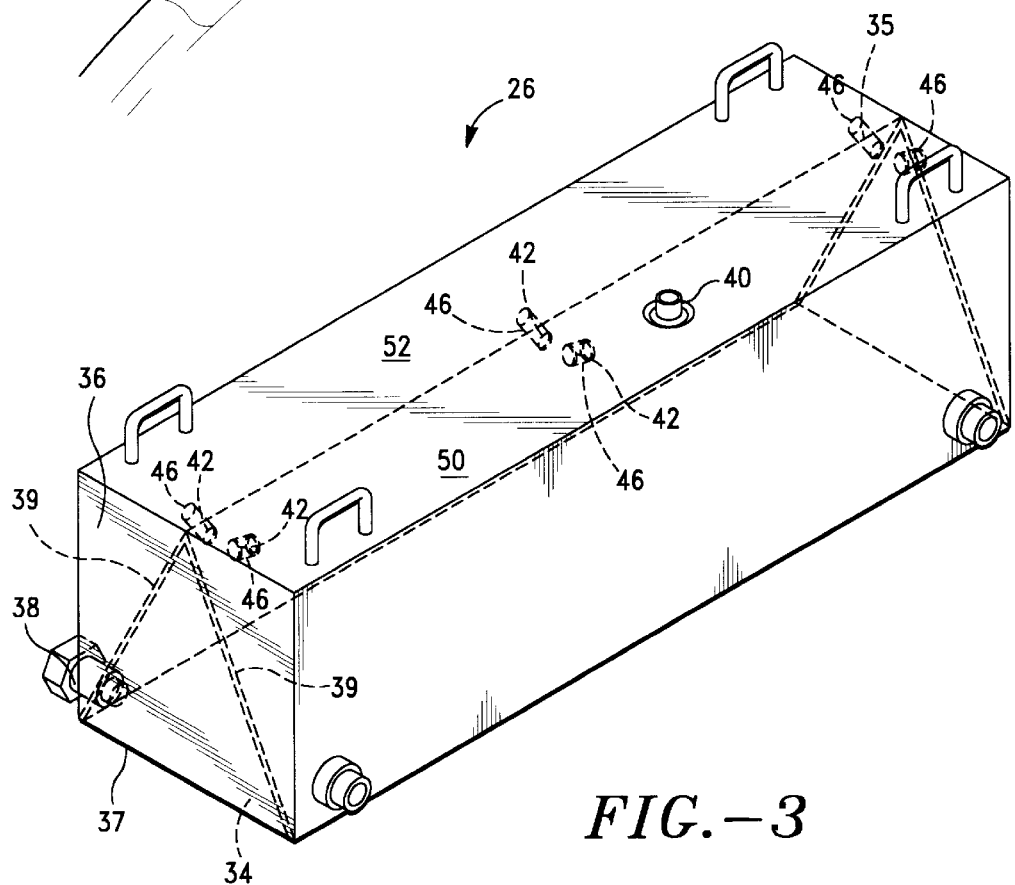
FIG. 3 is a single section of the portable dike in accordance with the present invention.

FIG. 3 shows a dike section 26. The dike section 26 has a lower partition 34 and an upper partition 36. The lower partition 34 and the upper partition 36 inflate. The lower partition 34 typically inflates with water to weight the dike section 26. The upper partition 36 typically inflates with air to shape and support the dike section 26. Accordingly, the lower partition 34 typically weighs more than the upper partition 36.

It can be appreciated that using fluids including air and water to fill each dike section 26 not only shapes each dike section 26 to a desired degree, but also allows the sections 26 to flex around curved roads and various non-uniform ground surfaces. While the lower partition inflates with water, it may also be partially, or fully, inflated with another fluid such as air. Additionally, the lower partition 34 pre-inflates with air to ease interconnection between adjoining sections. While the upper partition 36 typically inflates with air, a combination of water and air may inflate the upper partition 36 to further weight the section 26.

The lower partition 34 has a nominally triangular cross-section and forms a right triangular prism having a floor 37 and sides 39. The lower partition 34 includes water inlet 38 mounted in the side 39 and adjacent the floor 37. The water inlet 38 allows entry of water and air into the lower partition 34. The water inlet 38 also drains the lower partition 34.

The lower partition 34 includes a reinforced top edge 35 dividing the sides 39. The reinforced top edge 35 cooperates with the upper partition 36 to shape and reinforce the lower partition 34. According to one aspect of the invention, the reinforced top edge 35 is fabricated from steel cable.

The sides 39 include air vents 42. The air vents 42 are defined adjacent the top edge 35. The upper partition 36 surrounds at least part of the lower partition 34 to shape and support the dike 24 when the upper partition 36 inflates. The upper partition 36 has discrete lobes covering each side 39 of the lower partition 34. The lobes maintain fluid communication with each other and with the lower partition 34 via the vents 42. The upper partition 36 includes an air inlet 40 for inflation the upper partition with air.

According to one aspect of the invention, the vents 42 include pressure relief valves 46 to regulate lower partition 34 pressure. When lower partition 34 pressure exceeds a desired level, air is released through the pressure relief valves 46 into the upper partition 36 to inflate the upper partition 36. Accordingly, the lower partition 34 fully inflates to a desired pressure prior to full inflation of the upper partition 36. Full inflation of the upper partition 36 occurs when the air pressure in the upper partition 36 meets a desired level, exceeding ambient air pressure.

Figure 4:
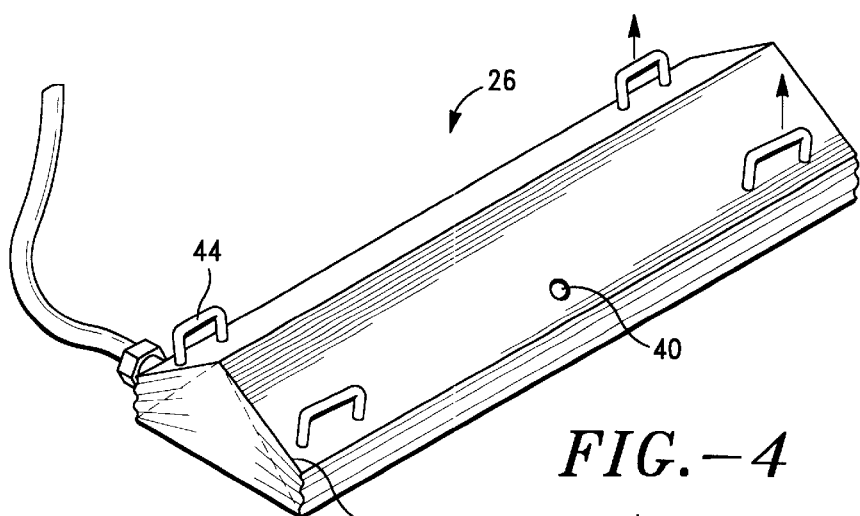
FIG. 4, FIG. 5 and FIG. 6 show sequential stages of inflating a dike section in accordance with the present invention.

FIG. 4 shows the dike section 26 in a nearly deflated configuration. The section 26 includes handles 44 for lifting the upper partition 36. Lifting the handles 44 forces ambient air into the upper partition inlet 40 to pre-inflate the upper partition 36.

Figure 5:
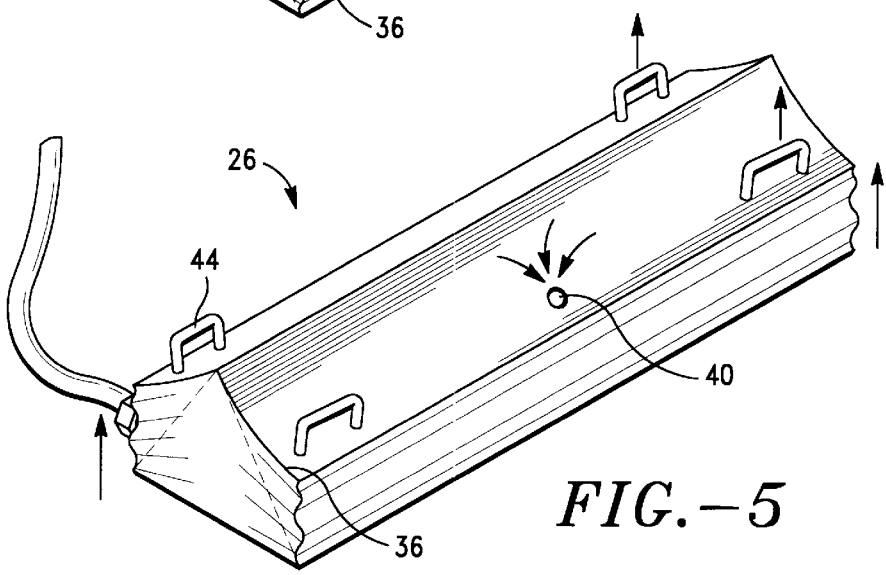

FIG. 5 shows the handles 40 lifting the section 26 into a partially inflated configuration. When the handles 40 lift, the upper partition 34 and lower partition 36 expand. Ambient air enters the air inlet 40, filling the expanded upper partition 34. Air from the upper partition 36 flows through the vents 42 (FIG. 3) to fill the lower partition 34. Lifting the handles 40, thus, pre-shapes the section 26 by pre-inflating the upper and lower partitions 34 and 36 with air at ambient pressure. Pre-shaping sections 26 eases placement, anchoring, interconnection, and water filling of sections at a desired location such as by a home or a roadside.

Figure 6:
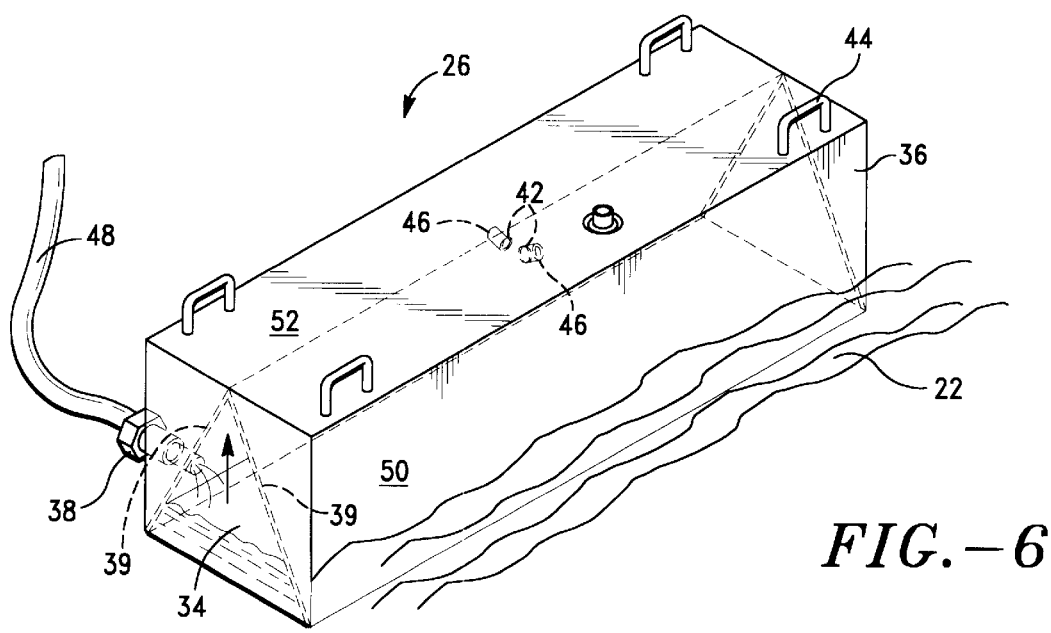

FIG. 6 shows the dike section 26 inflated. A hose 48 attaches to the water inlet 38 and delivers water directly to the lower partition 34. As water enters the lower partition 34, air pressure in the lower partition 34 increases. Some air escapes from the lower partition 34 via the vents 42 to increase air pressure in the upper partition 36. Accordingly, air pressure in the both partition of the section 26 increases when water enters the lower partition 34. Increased air pressure supports and shapes the section 26. Increased air pressure enables the upper partition 36 to achieve a degree of rigidity to keep water 22 from splashing over the section 26.

According to one aspect of the invention, the upper partition 36 has two lobes, 50 and 52, which are in fluid communication with each other. Each lobe 50 and 52 fully covers one side 39 of the lower partition 36. It can be appreciated that while the lobes 50 and 52 fully covering the sides 39 of the triangular prism shaped lower partition 34 are disclosed, the lobes 50 and 52 may be of any shape suitable for shaping and supporting the lower partition 34. Numerous lobes may be used to cover portions of the sides, or may be internally mounted within the water-fillable partition 36.

Figure 7:
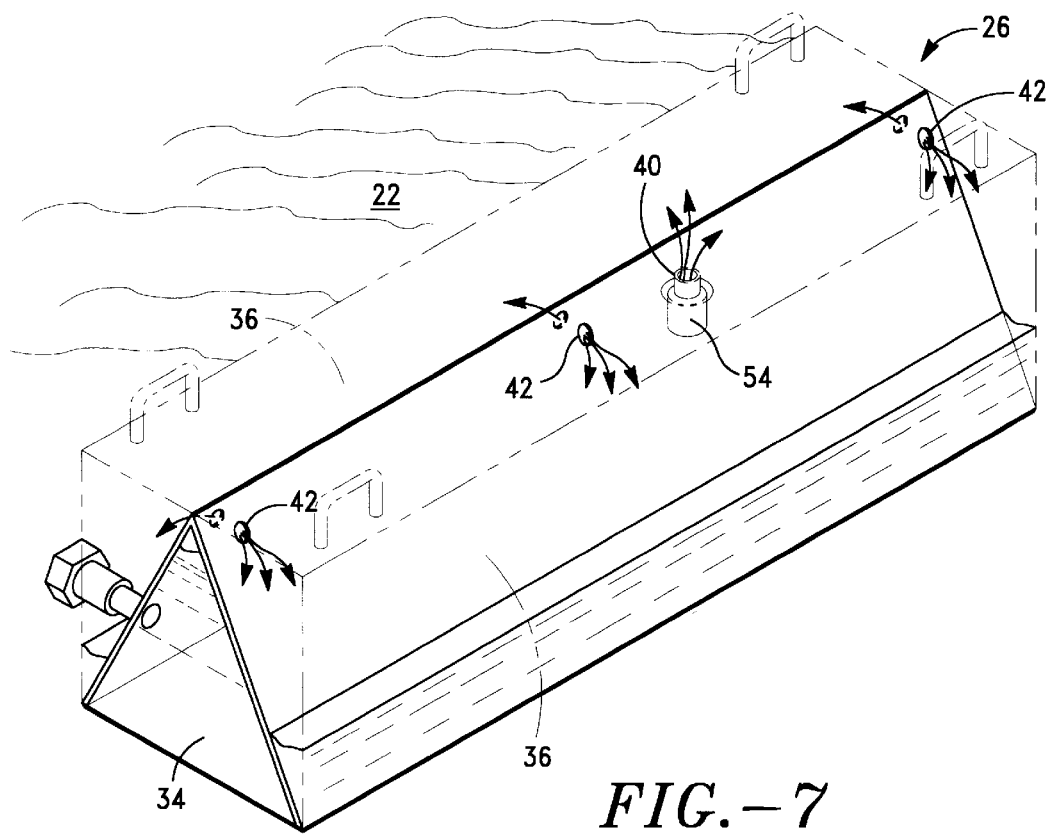
FIG. 7 shows water overflow from the lower partition to the upper partition of the portable dike in accordance with the present invention.

FIG. 7 shows water filling the lower partition 34. When the lower partition 34 is filled, i.e. the water level reaches the vents 42, water spills through the vents 42 into the upper partition 36. Water partially fills the upper partition 36 to add weight to the section 26. Weighting the upper partition 36 is desirable when the dike is used to stop flowing water, or water over a foot deep. Otherwise, it is normally most desirable to full the upper partition 36 only with air.

It can be appreciated that air pressure within the dike section 26 increases continually as water is added. The vents 42 are open according to one aspect of the invention, and do not include a pressure valve.

The upper partition inlet 40 includes a pressure relief valve 54 to bleed air out of the upper partition 36 at a desired pressure and thereby regulate pressure within the upper partition 36. Air is released so that the dike will not burst, or leak, from over-pressurization. The pressure relief valve 54 also assures that water flow into the dike will not be inhibited by over-pressurization.

The pressure relief valve 54 is removable to enable air to fill the section 26 when the handles 44 lift as shown in FIG. 5.

Figure 8:
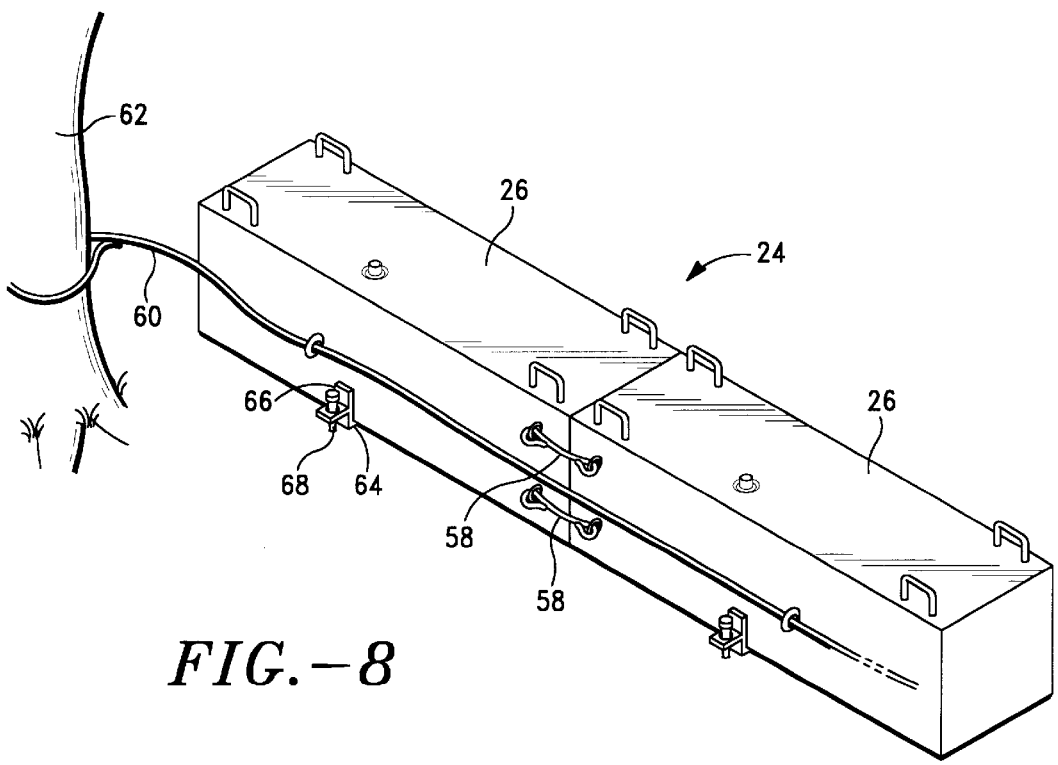
FIG. 8 shows two sections of the portable dike of FIG. 3 attached together, anchored and cabled to a tree.

FIG. 8 shows a dike 24 having pair of dike sections 26 cabled together with short cables 58. A long cable 60 interconnects both sections 26 and ties the sections 26 to a fixed object such as a tree 62. Cabling the sections 26 together and to a fixed object is particularly useful on a hillside where movement of an unrestrained dike is likely.

The dike sections 26 each include anchors 64. The anchor 64 has a bracket 66 attached to the dike. A stake 68 extends through the bracket to anchor the dike.

Figure 9:
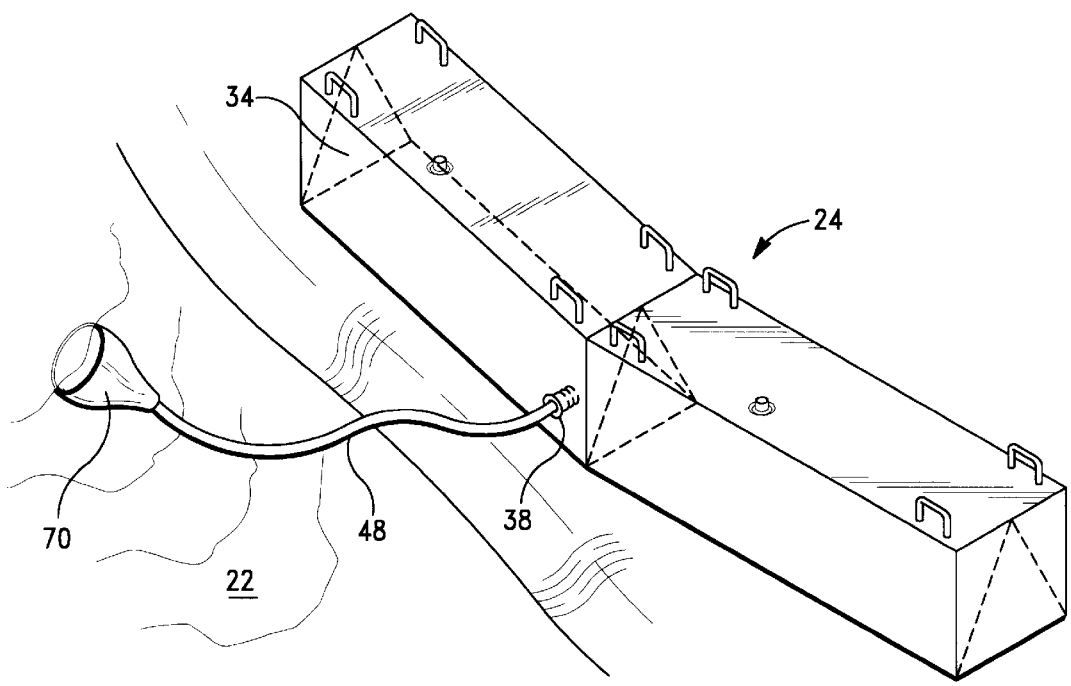
FIG. 9 shows a funnel and a hose inflating one section of the portable dike in accordance with the present invention.

FIG. 9 shows a funnel 70 and the hose 48 attached in fluid communication with the water inlet 38 of the dike 24. The funnel 70 collects water and the hose 48 delivers collected water to the water inlet 38 to inflate the lower partition 34 with water. Once the funnel 70 collects water, manually raising the funnel 70 allows gravity to fill the lower partition 34 with water.

The funnel 70 is preferably made from a pliable water-tight fabric to enable the funnel 70 to flex. Flexion of the funnel 70 enables the funnel to gather water from curbsides, crevices and other places which water may collect.

Figures 10, 11:
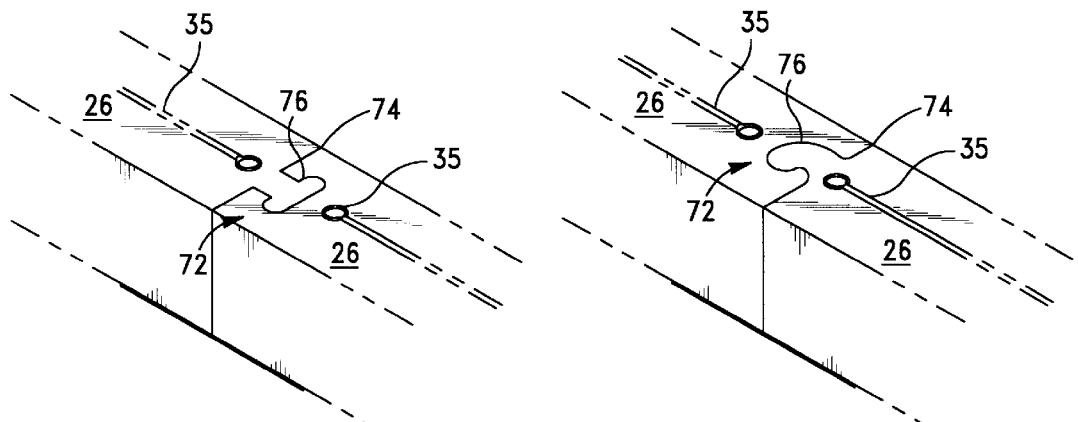
FIG. 10, FIG. 11 and FIG. 12 show various ways to interconnect sections of a portable dike.
Figure 12:
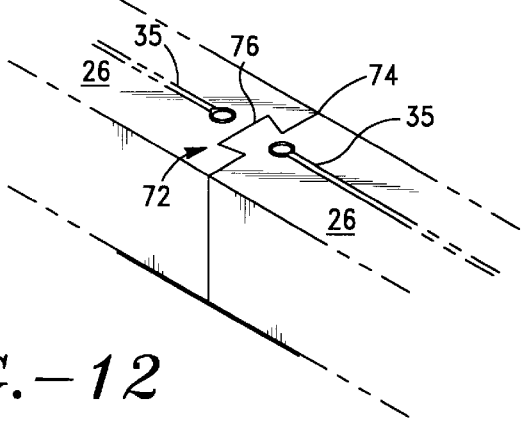

FIG. 10, FIG. 11 and FIG. 12 show adjacent sections 26 interconnected with shaped connectors generally designated with the reference numeral 72. Each shaped connector 72 includes an extended portion 74. Each section includes a recess 76. The extended portion 74 hooks the recess 76. The extended portion 74 aligns vertically to ease interconnection between adjacent sections 26. FIG. 12 particularly shows adjacent sections 26 having a dovetail interconnection.

Figure 13:
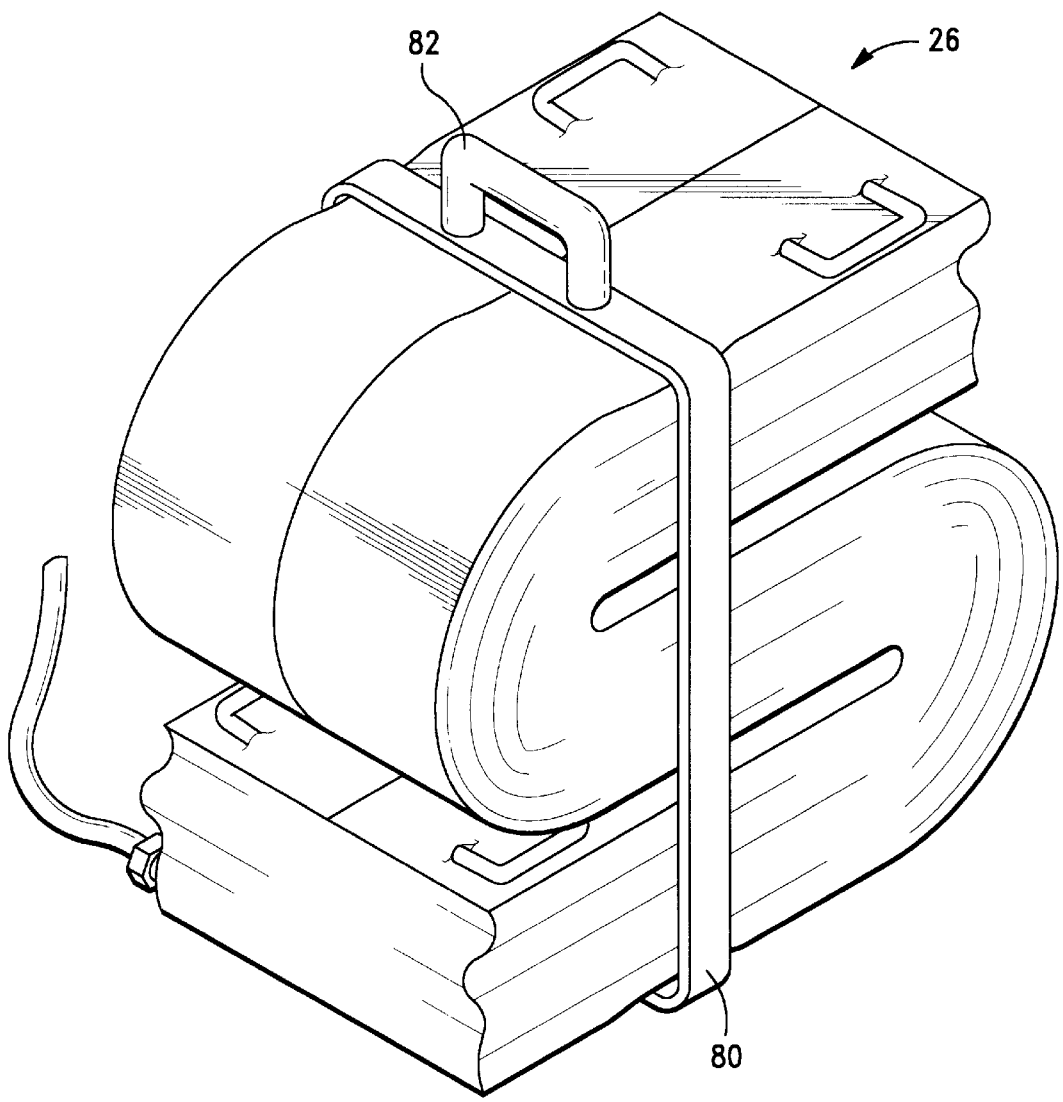
FIG. 13 shows a dike section folded and bound for transport and storage.

FIG. 13 shows the partition 26 folded. The partition 26 includes a carry strap 80 with a handle 82 for transporting the partition 26 when the partition 26 is deflated and folded.

While the foregoing detailed description has described various embodiments of the invention it is to be understood that the above description is illustrative only and not limiting of the disclosed invention. For example, there are many alternatives to shaping the upper and lower partitions. Additionally, there are also alternate ways of interconnecting the sections. Accordingly, the invention is to be limited only by the appended claims.

What is claimed is:

1. An inflatable dike section, comprising:
 a lower partition including a water inlet, the lower partition being water-fillable via the water inlet; and
 an upper partition attached to the lower partition, the upper partition including an air inlet for inflating the upper partition;
 the lower partition forms a triangular prism having a floor and two sides, and
 the upper partition has two lobes, the lobes cover the two sides, the lobes have a triangular prism shape and the dike section forms a square prism shape when the lower partition and the upper partition inflate.

2. An inflatable dike section as set forth in claim 1, wherein the dike section includes handles for lifting the upper partition to pre-inflate the upper partition and the lower partition with air.

3. An inflatable dike section as set forth in claim 2, wherein the lower partition has vents in fluid communication with the upper partition, the vents guide air from the lower partition into the upper partition as water fills the pre-inflated lower partition.

4. An inflatable dike section as set forth in claim 3, wherein the vents include pressure relief valves to regulate pressure within the lower partition.

5. An inflatable dike section as set forth in claim 1, wherein the upper partition inlet includes a pressure relief valve for regulating pressure within the upper partition.

6. An inflatable dike section as set forth in claim 1, wherein the lower partition has a top edge, the top edge is reinforced to support and shape the lower partition.

7. An inflatable dike section as set forth in claim 1, wherein the lower partition has a floor, the water inlet attaches adjacent the floor to enable the water inlet to function as a water drain.

8. An inflatable dike section as set forth in claim 1, wherein the dike section includes a funnel and hose which attach in fluid communication with the water inlet, the funnel collects water and the hose delivers collected water to the water inlet to inflate the lower partition with water.

9. An inflatable dike, comprising:
 a lower partition for enclosing fluid, the lower partition having an air vent, and a water inlet for delivering water into the lower partition; and
 an upper partition attached to the lower partition and being in fluid communication with the air vent, the upper partition being air inflatable to support the lower partition;
 the lower partition forms a triangular prism having a floor and two sides; and
 the upper partition has two lobes, the lobes cover the two sides, the lobes have a triangular prism shape and the dike forms a square prism shape when the lower partition and the upper partition inflate,
 whereby, delivering water through the water inlet inflates the upper partition with air.

10. An inflatable dike as set forth in claim 9, wherein the air vent has a pressure relief valve for regulating pressure in the lower partition.

11. An inflatable dike as set forth in claim 9, wherein the upper partition includes an air inlet, which cooperates with the air vent to inflate the upper partition.

12. An inflatable dike as set forth in claim 9, wherein the dike includes handles attached to the upper partition, the handles lift the upper partition to pre-shape the upper and lower partitions.

13. An inflatable dike as set forth in claim 9, wherein the dike includes two interconnecting sections, one section has an extended portion, which hooks the other section.

14. An inflatable dike as set forth in claim 13, wherein a cable interconnects the two sections.

15. An inflatable dike as set forth in claim 14, wherein the dike includes an anchor, the anchor includes a bracket attached to the dike and a stake extending through the bracket to anchor the dike.

16. An inflatable dike as set forth in claim 9, wherein the dike includes a funnel and hose which attach in fluid communication with the water inlet, the funnel collects water and the hose delivers collected water to the lower partition to inflate the lower partition with water.

17. An inflatable dike as set forth in claim 9, wherein the dike includes a carry strap.

18. An inflatable dike section, comprising:
 a lower partition including a water inlet, a floor and two sides defining a triangular prism shape, the lower partition being water-fillable via the water inlet; and
 an upper partition attached to the lower partition, the upper partition having two air-inflatable lobes and an air inlet for inflating the upper partition lobes, the lobes cover each of the sides of the lower partition;
 and lobes have a triangular prism shape and the dike section forms a square prism shape when the lower partition and the upper partition inflate.

\* \* \* \* \*